United States Patent
Bangalore

(10) Patent No.: US 9,465,870 B2
(45) Date of Patent: *Oct. 11, 2016

(54) SYSTEM AND METHOD FOR DIGITAL VIDEO RETRIEVAL INVOLVING SPEECH RECOGNITION

(71) Applicant: AT&T Intellectual Property I, L.P., Atlanta, GA (US)

(72) Inventor: Srinivas Bangalore, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,100

(22) Filed: Sep. 10, 2015

(65) Prior Publication Data

US 2015/0379124 A1 Dec. 31, 2015

Related U.S. Application Data

(63) Continuation of application No. 13/943,220, filed on Jul. 16, 2013, now Pat. No. 9,135,336, which is a continuation of application No. 12/019,786, filed on Jan. 25, 2008, now Pat. No. 8,487,984.

(51) Int. Cl.
| | |
|---|---|
| *H04L 29/06* | (2006.01) |
| *G06F 21/00* | (2013.01) |
| *G06F 17/30* | (2006.01) |
| *G10L 15/26* | (2006.01) |
| *H04N 21/439* | (2011.01) |
| *H04N 21/4402* | (2011.01) |
| *H04N 21/482* | (2011.01) |
| *H04N 21/8547* | (2011.01) |
| *G09B 21/00* | (2006.01) |

(52) U.S. Cl.
CPC ....... *G06F 17/30796* (2013.01); *G09B 21/006* (2013.01); *G10L 15/26* (2013.01); *H04N 21/4394* (2013.01); *H04N 21/440236* (2013.01); *H04N 21/4828* (2013.01); *H04N 21/8547* (2013.01)

(58) Field of Classification Search
CPC .................. G06F 17/30796; H04N 21/4828; H04N 21/4394; H04N 21/8547; H04N 21/440236; G10L 15/26
See application file for complete search history.

(56) References Cited

U.S. PATENT DOCUMENTS

| | | | | |
|---|---|---|---|---|
| 5,345,226 A | * | 9/1994 | Rice, Jr. .............. | H04M 1/2474 340/4.11 |
| 5,512,938 A | | 4/1996 | Ohno | |
| 6,611,803 B1 | * | 8/2003 | Furuyama ......... | G06F 17/30017 704/235 |

(Continued)

OTHER PUBLICATIONS

Turner et al., "Audio Description Text for Indexing Films", Aug. 2007, pp. 1-11. World Library and Information Congress: 73$^{rd}$ IFLA General Conference and Council.

*Primary Examiner* — Lisa Lewis

(57) ABSTRACT

Disclosed are systems, methods, and computer readable media for retrieving digital images. The method embodiment includes converting a descriptive audio stream of a digital video that is provided for the visually impaired to text and then aligning that text to the appropriate segment of the digital video. The system then indexes the converted text from the descriptive audio stream with the text's relationship to the digital video. The system enables queries using action words describing a desired scene from a digital video.

17 Claims, 3 Drawing Sheets

(56) References Cited

U.S. PATENT DOCUMENTS

| | | |
|---|---|---|
| 6,728,673 B2 | 4/2004 | Furuyama et al. |
| 7,554,522 B2 * | 6/2009 | Sinclair, II ............ G06F 3/0481 345/156 |
| 7,933,338 B1 * | 4/2011 | Choudhry ......... G06F 17/30781 375/240.26 |
| 2002/0010916 A1 | 1/2002 | Thong et al. |
| 2002/0129692 A1 * | 9/2002 | Barile ................. G10H 1/0041 84/609 |
| 2003/0048928 A1 * | 3/2003 | Yavitz ..................... G06F 17/27 382/114 |
| 2006/0050794 A1 * | 3/2006 | Tan ...................... H04N 21/235 375/240.26 |
| 2008/0091716 A1 * | 4/2008 | Barkeloo .......... G06F 17/30017 |
| 2008/0119953 A1 * | 5/2008 | Reed ................. G06F 17/30017 700/94 |

* cited by examiner

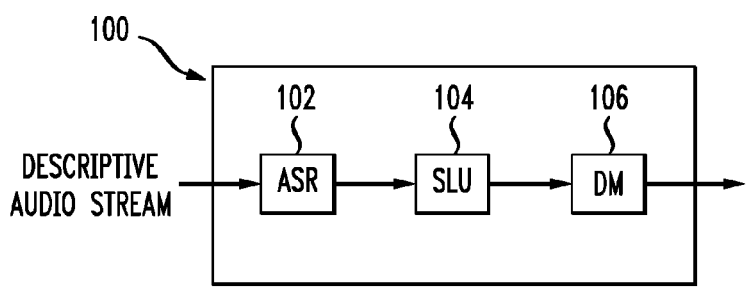
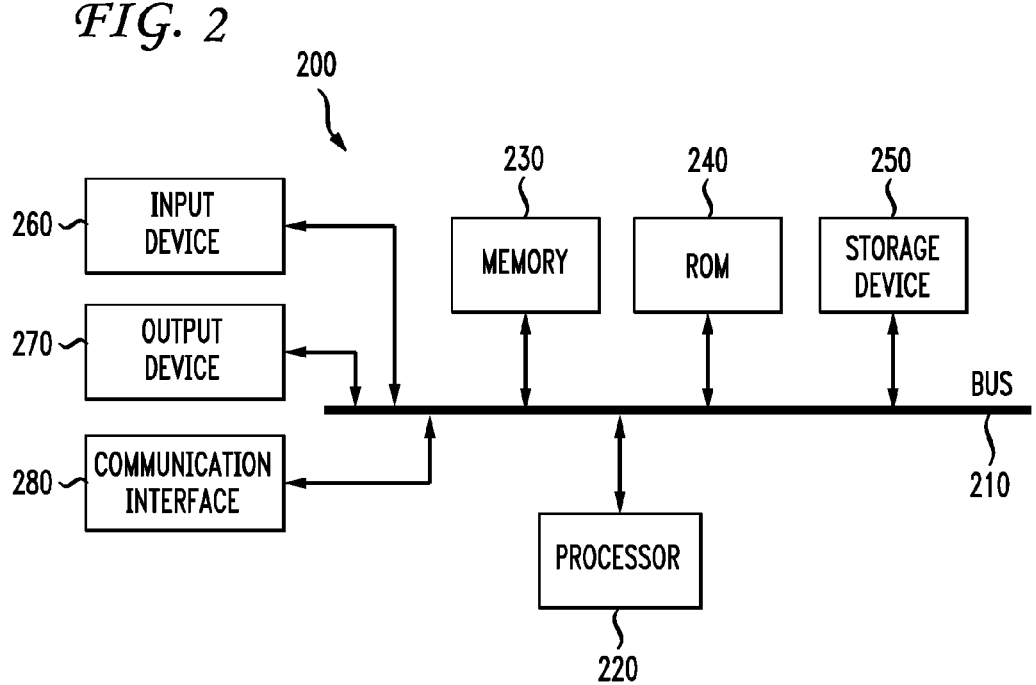

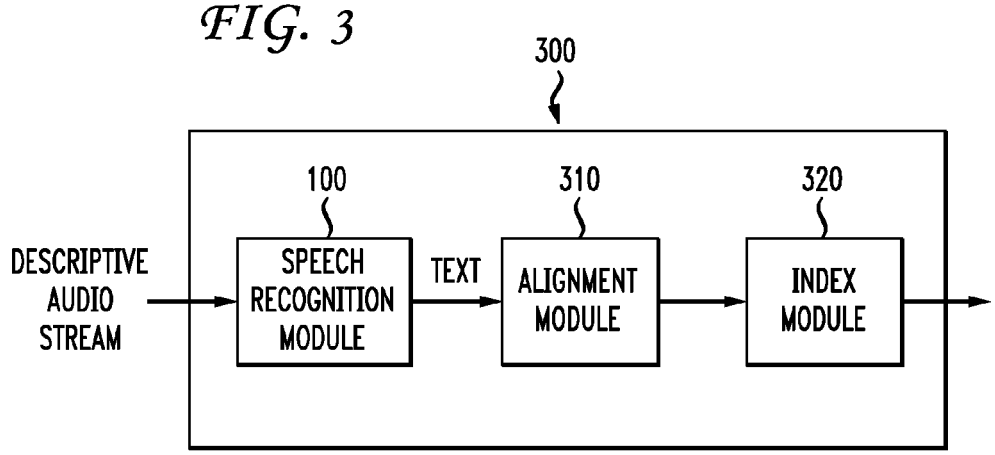
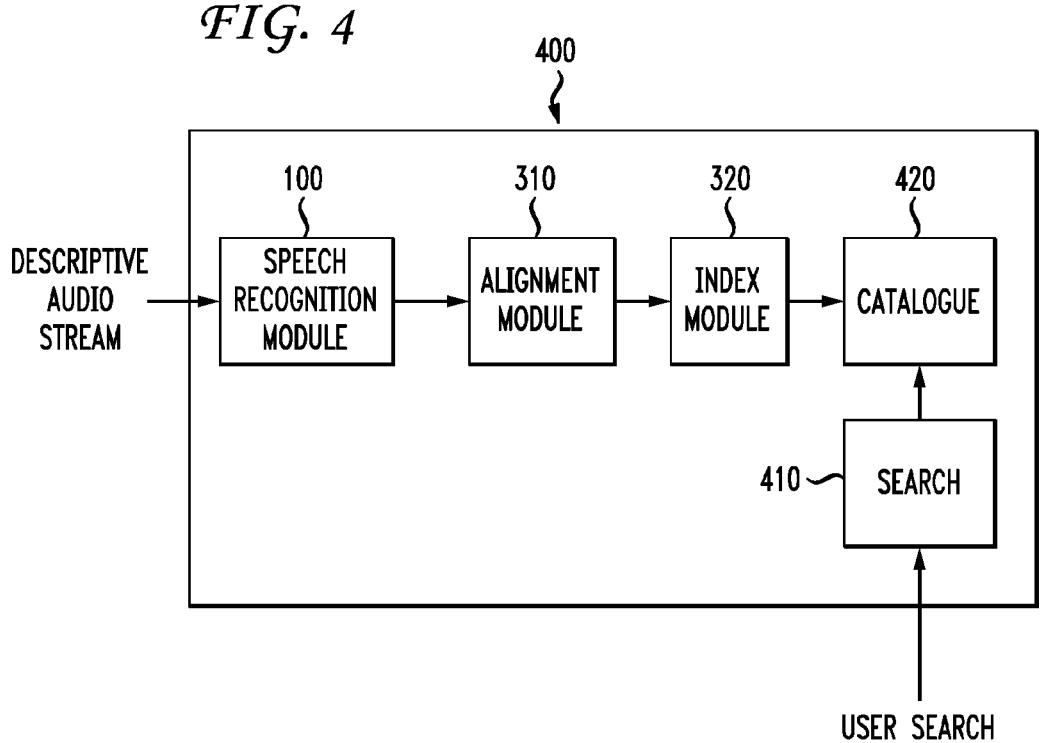

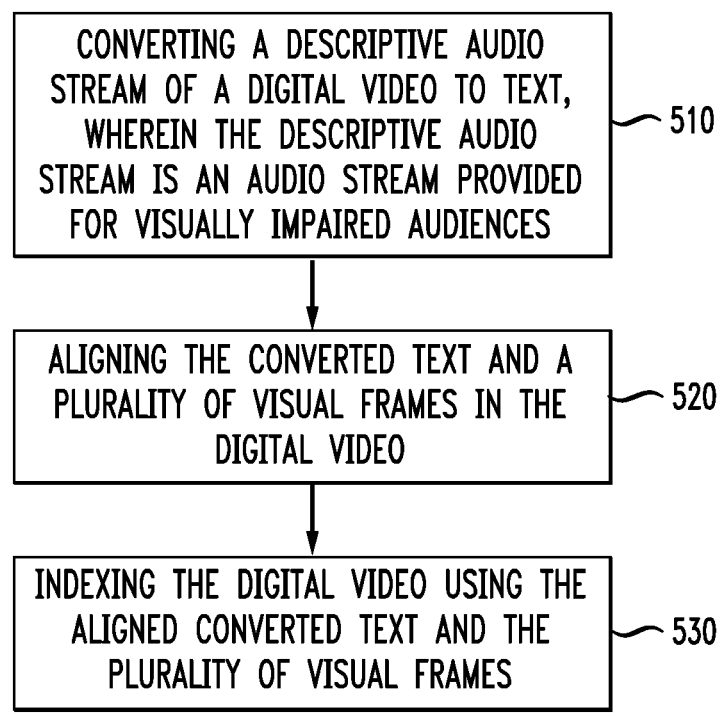

SYSTEM AND METHOD FOR DIGITAL VIDEO RETRIEVAL INVOLVING SPEECH RECOGNITION

PRIORITY INFORMATION

The present application is a continuation of U.S. patent application Ser. No. 13/943,220, filed Jul. 16, 2013, which is continuation of U.S. patent application Ser. No. 12/019,786, filed Jan. 25, 2008, now U.S. Pat. No. 8,487,984, filed Jul. 16, 2013, the content of which is incorporated herein by reference in its entirety.

BACKGROUND OF THE INVENTION

1. Field of the Invention

The invention relates to video retrieval and more specifically to developing an indexed library by processing a text stream transmitted with a media presentation to enable later retrieval of one or more portions of the media content.

2. Introduction

Multimedia currently provides many advantages to those of some diminished physical capacity. For example, those that visually impaired have previously had difficulty enjoying a movie or a program. One recent advantage to help in this regard is a descriptive audio track added to media in order to allow someone to still fully enjoy a media event. As one example, movies are now available with a separate track of audio that will describe the actions and events taking place on the screen so that even those unable to see the screen, can still garner an understanding of what is taking place in the movie. Further, these descriptive audio tracks are being included when movies are widely distributed in a digital format so that movies can be enjoyed by those with a visual disability in the home.

Many digital formats are available to the consumer, including downloadable movies in varying formats, digital movies distributed over cable or fiber optics, high definition movies, as well as DVD movies. In all of these formats, a descriptive audio stream can be included in order to appeal to the visually impaired. Regardless of the digital format, the descriptive audio track is typically available in a high quality digital format that an automatic speech recognition program can convert into text.

It is known in the art to use automatic speech recognition (ASR) to retrieve video about a certain subject that is part of the conversation in the presentation. For example, using ASR or a movie, and then based on that data, retrieving the segments that talk about a dog or cat. This approach has deficiencies, however, in that the conversation in the media may never mention "cat" or "dog" and may thus not provide the best indexing mechanism. What is needed in the art is an improved method of retrieving portions of a video presentation.

SUMMARY OF THE INVENTION

Additional features and advantages of the invention will be set forth in the description which follows, and in part will be obvious from the description, or can be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and computer readable media for retrieving digital images. A library is developed by converting to text a descriptive audio stream that is provided for the visually impaired from a digital video. The system will then align the text from the converted descriptive audio stream to the digital video so that the text is in synch with the digital video. The system will then create an index containing the key words from the text for searching and retrieval.

The principles of this system better utilize available resources to index and retrieve digital images from digital video by using an index created from the converted text of a descriptive audio stream. More specifically, the system utilizes the descriptive audio stream included in digital videos, the descriptive audio stream being provided for the visually impaired. The audio stream may be a descriptive audio stream that differs from the audio of participants in the media and describes what is being displayed in the media. An aspect of the invention that provides an improvement is the retrieval of verbs. For example, a search based on the test "show me videos of a man standing" is not possible in the prior methods without someone annotating each frame with this information. The description audio enables the system to develop the indexed media that can be responsive to such questions.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates an example system for analyzing a descriptive audio stream and converting it to text;

FIG. 2 illustrates a basic system or computing device embodiment of modules within the system;

FIG. 3 illustrates a system that aligns and indexes the descriptive audio stream;

FIG. 4 illustrates a system that will catalogue and search the indexed descriptive audio stream; and FIG. 5 illustrates a method embodiment of the present system.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations can be used without parting from the spirit and scope of the invention.

Speech recognition systems aim to identify intents of humans, expressed in natural language, and take actions accordingly, to satisfy their requests. FIG. 1 is a functional block diagram of an exemplary natural language speech recognition system 100. Natural language speech recognition system 100 can include an automatic speech recognition (ASR) module 102, a spoken language understanding (SLU)

module 104, a dialog management (DM) module 106. The present invention focuses on innovations related to using these components to convert to text a descriptive audio stream. The descriptive audio stream is preferably an audio track that differs from the conversational or other audio that is part of the media presentation. The descriptive audio is for the visually impaired and describes a scene. For example, the track may say "a care is speeding down the highway being chased by a police car" or "a man is standing in front of a house," and so forth.

ASR module 102 can analyze speech input and can provide a transcription of the speech input as output. SLU module 104 can receive the transcribed input and can use a natural language understanding model to analyze the group of words that are included in the transcribed input to derive a meaning from the input. The role of DM module 106 is to interact in a natural way and help the user to achieve the task that the system is designed to support. DM module 106 can receive the meaning of the speech input from SLU module 104 and can determine an action, such as, for example, providing a proper interpretation into text, based on the input.

Thus, the modules of system 100 can recognize speech input, such as speech utterances, can transcribe the speech input, and can identify (or understand) the meaning of the transcribed speech. In this manner, the input can be a natural language dialog from the digital video that is communicated to the system 100. Those of ordinary skill in the art will understand the programming languages and means for generating and training ASR module 102 or any of the other modules in the speech recognition system. Further, the modules of system 100 can operate independent of a full dialog system.

FIG. 2 illustrates an exemplary processing system 200 in which one or more of the modules of system 100 can be implemented. Thus, system 100 can include at least one processing system, such as, for example, exemplary processing system 200. System 200 can include a bus 210, a processor 220, a memory 230, a read only memory (ROM) 240, a storage device 250, an input device 260, an output device 270, and a communication interface 280. Bus 210 can permit communication among the components of system 200.

Processor 220 can include at least one conventional processor or microprocessor that interprets and executes instructions. Memory 230 can be a random access memory (RAM) or another type of dynamic storage device that stores information and instructions for execution by processor 220. Memory 230 can also store temporary variables or other intermediate information used during execution of instructions by processor 220. ROM 240 can include a conventional ROM device or another type of static storage device that stores static information and instructions for processor 220. Storage device 250 can include any type of media, such as, for example, magnetic or optical recording media and its corresponding drive.

Input device 260 can include one or more conventional mechanisms that permit a user to input information to system 200, such as a keyboard, a mouse, a pen, motion input, a voice recognition device, etc. Output device 270 can include one or more conventional mechanisms that output information to the user, including a display, a printer, one or more speakers, or a medium, such as a memory, or a magnetic or optical disk and a corresponding disk drive. Communication interface 280 can include any transceiver-like mechanism that enables system 200 to communicate via a network. For example, communication interface 280 can include a modem, or an Ethernet interface for communicating via a local area network (LAN). Alternatively, communication interface 280 can include other mechanisms for communicating with other devices and/or systems via wired, wireless or optical connections. In some implementations of natural language speech recognition system 100, communication interface 280 may not be included in processing system 200 when natural language speech recognition system 100 is implemented completely within a single processing system 200.

System 200 can perform such functions in response to processor 220 executing sequences of instructions contained in a computer-readable medium, such as, for example, memory 230, a magnetic disk, or an optical disk. Such instructions can be read into memory 230 from another computer-readable medium, such as storage device 250, or from a separate device via communication interface 280.

One embodiment of the present system allows the descriptive audio stream from the digital formats available to the consumer to be analyzed by a speech recognition system to better achieve an index of searchable quality to find specific scenes in a movie.

FIG. 3 illustrates an example embodiment of the system. The descriptive audio from the digital video source is processed by a speech recognition module 100, as shown in FIG. 1, to convert the audio stream to text. This text is subsequently run through an alignment module 310 that aligns the text from the audio to its respective place in the video. Once the text and video are properly aligned, the indexing module 320 will index the text such that it is in a retrievable format. Because the described audio will more likely include verbs in the description, this enables better retrieval availability than process methods. For example, searches such as "show me videos of a woman sitting" are capable of being retrieved because processing of such action or descriptive words occurs via the use of the descriptive audio. One benefit of this approach is that the descriptive audio stream comes from high quality descriptive audio which results in better accuracy than ASR from conversational audio from the scenes.

The alignment module 310 can operate in a number of different ways. Initially, it is possible for the input stream to contain both audio and visual characteristics and the system to analyze and break down the video into a frame by frame format and align the text from the descriptive audio stream with the frame associated with that text. Therefore, assuming there are 30 frames per second in a particular digital video, the text that is converted from the 30:16:24 (minute:second:frame) of the descriptive audio stream is aligned with the frame of the digital video from 30:16:24. This allows the text to be associated with the appropriate segment of the digital video. This form of alignment is very precise due to the very small time frame involved in a frame by frame analysis. However, the alignment module 310 will function properly on a different time scales as well. Depending on the rate and quality of the audio stream, an alignment using one second intervals might prove more appropriate.

It is further possible for the alignment module to use a bit rate or other characteristic of the audio stream to independently process the text stream and align it appropriately to the digital video. This is accomplished by calculating the byte rate of the digital video and knowing that there are, for example, 250 megabytes per minute of digital video. The alignment module 310 will compare the 250 megabytes per minute of the digital video to the 1 megabit per second of the descriptive audio stream, and thus align the video and audio based on the total number of bits or bytes that the alignment module has converted to text. This allows the alignment module to align the digital video and the descriptive audio stream by characteristics that are a proxy for time rather than the actual elapsed time.

The indexing module 320 will create an index of the text that is created by module 100 and aligned to the digital video by alignment module 310 so that the aligned text is appropriately available. Thus, the text of individual words associated with the descriptive audio stream are collected and formed into an index that allows a user to find key words associated with the digital video. It primarily indexes key words due to the ubiquitous use of words that have no defining characteristic helpful in an index. Examples of these words include the, and, it, etc. that provide no value to an index because these words appear throughout a digital video where as the word "dog" may appear only a handful of times. The created index will contain the terms culled from the aligned text allowing specific terms to be associated temporally with the digital video.

It is further an object of the indexing module 320 to be able to analyze the digital video frames for optical character recognition in order to aide in indexing. This aspect of the indexing module 320 will help broaden the amount of data available for indexing by analyzing the frames for optical characters that are recognizable to the system. This requires scanning the frames for terms and phrases that add to the index of key words.

A further embodiment of the present system is depicted in FIG. 4. In FIG. 4, a searching module 410 and catalogue 420 are included in system 400. This allows a user to enter requests into the search module to find the location of a specific segment of a digital movie. The search tool can use any algorithm known to those of ordinary skill in the art, and further can expand queries appropriately to encompass what the user intends. Thus a search for "dog" can include Labrador, mutt, hound, etc while still bringing results intended from the movie the user is searching. The catalogue collects the indexed text in order to create a catalogue of terms, in a searchable manner, associated with the digital movie.

Therefore, the search module has access to the catalogue, allowing the user to find a scene or segment of a digital movie. Another application of the present system allows the catalogue to store a whole library of indexed, allowing a user to search a whole library for a certain scene or segment rather than a specific movie. This further opens the system up to searches for types of movies rather than scenes the user wishes to see. This distinction, further explained by the following example, is a user wishing to see a movie with a sword fight. The search module would return only the results from the thousands of movies that contain a description that would implicate a sword fight takes place in that particular movie. This is different from the situation where the user knows exactly which movie the user is looking for, and is now only searching for the specific scene in that movie. However, the search module can function in either of these capacities.

One further application of the system in FIG. 4 is that the system 400 can be located at a remote location and receive a user query via the internet or through a cable connection to find an appropriate movie. This embodiment can apply over the internet, where the search of the catalogue allows the user to download the appropriate digital video from the search results. Another option is to combine this with a pay per view scenario, where the catalogue is searched via a cable connection to facilitate finding an appropriate pay per view movie.

The embodiments of the present system are further able to use the descriptive audio track for visually impaired viewers in conjunction with other aspects of the digital movie. For instance, it is within the scope of the present claims to convert all language tracks, including descriptions in foreign languages, to text and subsequently include them in the catalogue for a search. There is nothing in the claims of the present application precluding the use of dialogue, descriptive audio stream, closed captions, subtitles, and foreign language versions of these aforementioned audio and text streams from a digital video, converting them all to text, and including them as part of the catalogue. However, the most thorough and useful of these many streams will be the descriptive audio stream for visually impaired viewers.

The present system can further function on many different digital platforms. Some further digital protocols that are consistent with the present claims include DVD, high definition disc formats (including but not limited to HD-DVD and Blu-ray), MPEG-4, or H.264. In these different formats there are different characteristics or objects that are independently manipulated to gather further information particularly to help in the area of indexing.

FIG. 5 represents another embodiment of the present system as a method. As shown a method for the retrieval of digital images can include: converting a descriptive audio stream of a digital video to text, wherein the descriptive audio stream is an audio stream provided for visually impaired audiences (510), aligning the converted text and a plurality of visual frames in the digital video (520), and indexing the digital video using the aligned converted text and the plurality of visual frames (530). The conversion may be done using standard and known ASR techniques. There may be further enhancements that include utilizing data from the conversational ASR and/or optical analysis of the scene to improve upon the result of ASR for the descriptive audio. For example, if the optical/audio analysis indicates a man with facial hair, the descriptive audio of "the bearded man walks down the street" may be recognized with great accuracy. For example, otherwise the ASR may result in "the feared man walks down the street." Accordingly, knowing that the descriptive stream describes the images in the media enables the advantages of use of other visual data to improve performance.

Embodiments within the scope of the present invention can also include computer-readable media for carrying or having computer-executable instructions or data structures stored thereon. Such computer-readable media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention can be practiced in network computing environments with many types of computer system configurations, including personal computers, hand-held devices, multi-processor systems, microprocessor-based or programmable consumer electronics, network PCs, minicomputers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Although the above description can contain specific details, they should not be construed as limiting the claims in any way. Other configurations of the described embodiments of the invention are part of the scope of this invention. For example, the search module can be contained as part of the cataloguing system or both the search and catalogue modules can be part of the indexing module. In this manner there are many ways to set up the system with different modules to achieve the scope of the presently presented claims. Accordingly, the appended claims and their legal equivalents should only define the invention, rather than any specific examples given.

I claim:

1. A method comprising:
receiving a query for a portion of a video;
identifying, via a processor, the portion of the video using an index, wherein the index is generated by aligning text from a digital audio stream associated with the video to frames in the video based on a non-textual optical analysis of the video, and wherein the aligning of the text utilizes a first bit rate associated with the frames in the video and a second bit rate associated with the digital audio stream; and
presenting the portion of the video in response to the query.

2. The method of claim 1, wherein the query is an action word describing the portion of the video.

3. The method of claim 1, wherein the index is generated upon receiving the query.

4. The method of claim 1, wherein the text from the digital audio stream is provided for visually impaired audiences.

5. The method of claim 1, wherein the aligning of the text from the digital audio stream to the frames in the video further comprises converting the digital audio stream to the text using the non-textual optical analysis of the video.

6. The method of claim 5, wherein the non-textual optical analysis recognizes objects within the video.

7. A system comprising:
a processor; and
a computer-readable storage device having instructions stored which, when executed by the processor, cause the processor to perform operations comprising:
receiving a query for a portion of a video;
identifying the portion of the video using an index, wherein the index is generated by aligning text from a digital audio stream associated with the video to frames in the video based on a non-textual optical analysis of the video, and wherein the aligning of the text utilizes a first bit rate associated with the frames in the video and a second bit rate associated with the digital audio stream; and
presenting the portion of the video in response to the query.

8. The system of claim 7, wherein the query is an action word describing the portion of the video.

9. The system of claim 7, wherein the index is generated upon receiving the query.

10. The system of claim 7, wherein the text from the digital audio stream is provided for visually impaired audiences.

11. The system of claim 7, wherein the aligning of the text from the digital audio stream to the frames in the video further comprises converting the digital audio stream to the text using the non-textual optical analysis of the video.

12. The system of claim 11, wherein the non-textual optical analysis recognizes objects within the video.

13. A computer-readable storage device having instructions stored which, when executed by a computing device, cause the computing device to perform operations comprising:
receiving a query for a portion of a video;
identifying the portion of the video using an index, wherein the index is generated by aligning text from a digital audio stream associated with the video to frames in the video based on a non-textual optical analysis of the video, wherein the aligning of the text when the index is generated further comprises utilizing a first bit rate associated with the frames in the video and a second bit rate associated with the digital audio stream; and
presenting the portion of the video in response to the query.

14. The computer-readable storage device of claim 13, wherein the query is an action word describing the portion associated with the video.

15. The computer-readable storage device of claim 13, wherein the index is generated upon receiving the query.

16. The computer-readable storage device of claim 13, wherein the text from the digital audio stream is provided for visually impaired audiences.

17. The computer-readable storage device of claim 13, wherein the aligning of the text from the digital audio stream to the frames in the video further comprises converting the digital audio stream to the text using the non-textual optical analysis of the video.

* * * * *